US010590308B2

(12) United States Patent
Boström et al.

(10) Patent No.: US 10,590,308 B2
(45) Date of Patent: Mar. 17, 2020

(54) COATING COMPOSITIONS AND TREATING METHOD

(71) Applicant: SIOO FÄRGKULTUR AB, Göteborg (SE)

(72) Inventors: Herje Boström, Göteborg (SE); Börje Gevert, Hisings Kärra (SE)

(73) Assignee: SIOO FÄRGKULTUR AB, Göteborg (SE)

( * ) Notice: Subject to any disclaimer, the term of this patent is extended or adjusted under 35 U.S.C. 154(b) by 51 days.

(21) Appl. No.: 16/065,392

(22) PCT Filed: Dec. 23, 2016

(86) PCT No.: PCT/EP2016/082562
§ 371 (c)(1),
(2) Date: Jun. 22, 2018

(87) PCT Pub. No.: WO2017/109174
PCT Pub. Date: Jun. 29, 2017

(65) Prior Publication Data
US 2019/0002731 A1  Jan. 3, 2019

Related U.S. Application Data

(60) Provisional application No. 62/387,233, filed on Dec. 23, 2015.

(30) Foreign Application Priority Data

Dec. 23, 2015  (SE) ..................................... 1551715

(51) Int. Cl.
| | | |
|---|---|---|
| C09D 183/04 | (2006.01) |
| C09D 183/02 | (2006.01) |
| C04B 28/26 | (2006.01) |
| C04B 24/42 | (2006.01) |
| B27K 3/20 | (2006.01) |
| C04B 28/24 | (2006.01) |
| B27K 3/50 | (2006.01) |
| B27K 3/52 | (2006.01) |
| C09D 7/61 | (2018.01) |
| C09D 7/63 | (2018.01) |
| C08K 3/34 | (2006.01) |
| C08K 5/541 | (2006.01) |
| B27K 3/08 | (2006.01) |
| C08L 83/04 | (2006.01) |
| B27K 3/02 | (2006.01) |
| C04B 111/00 | (2006.01) |

(52) U.S. Cl.
CPC .......... *C09D 183/04* (2013.01); *B27K 3/0278* (2013.01); *B27K 3/20* (2013.01); *B27K 3/50* (2013.01); *B27K 3/52* (2013.01); *C04B 24/42* (2013.01); *C04B 28/24* (2013.01); *C04B 28/26* (2013.01); *C08K 3/34* (2013.01); *C08K 5/541* (2013.01); *C09D 7/61* (2018.01); *C09D 7/63* (2018.01); *C09D 183/02* (2013.01); *B27K 3/08* (2013.01); *B27K 2240/70* (2013.01); *C04B 2111/00482* (2013.01); *C08L 83/04* (2013.01)

(58) Field of Classification Search
CPC .......... C09D 183/04; C09D 7/61; C09D 7/63; C09D 183/02; B27K 3/0278; B27K 3/20; B27K 3/50; B27K 3/52; B27K 3/08; B27K 2240/70; C04B 24/42; C04B 28/24; C04B 28/26; C04B 2111/00482; C08K 3/34; C08K 5/541; C08L 83/04
USPC ......................................................... 524/267
See application file for complete search history.

(56) References Cited

U.S. PATENT DOCUMENTS

2008/0206678 A1 * 8/2008 Levanon ............... B41C 1/1008
430/286.1

FOREIGN PATENT DOCUMENTS

WO   WO-2007111556 A2   10/2007

OTHER PUBLICATIONS

International Search Report dated Apr. 3, 2017 for PCT Application No. PCT/EP2016/082562.
Milton J. Rosen, "Wetting and Its Modification by Surfactants", Surfactants and Interfacial Phenomena, John Wiley & Sons, pp. 243-272, 2004.
Office Action from Swedish Patent And Registration Office dated Aug. 9, 2016 for Patent Application No. 1551715-4.

* cited by examiner

*Primary Examiner* — William K Cheung
(74) *Attorney, Agent, or Firm* — Moser Taboada

(57) ABSTRACT

The present invention relates to an aqueous coating composition system for the treatment of cellulosic articles, which includes a first aqueous composition having a pH of at least 10 and comprises potassium silicate and a penetration aiding agent, wherein the potassium silicate is present in a range of from 1.5 to 32% by weight, the molar ratio of silicon (Si) to potassium (K) of said potassium silicate is 1.2-2.1; and a second aqueous composition comprising an emulsion of at least one alkoxy silane and/or siloxane compound. The present invention further relates to a method for treating cellulosic articles and uses thereof.

36 Claims, No Drawings

COATING COMPOSITIONS AND TREATING METHOD

This application is the U.S. 371 National Stage Application of PCT International Application No. PCT/EP2016/082562, with international filing date of Dec. 23, 2016, which claims priority to Sweden Patent Application No. 1551715-4, filed Dec. 23, 2015, and U.S. Provisional patent application No. 62/387,233, filed Dec. 23, 2015, the contents of which are incorporated herein by reference in their entireties.

FIELD OF THE INVENTION

The present invention relates to coating compositions and method for treating cellulosic materials.

BACKGROUND

Preservation of wooden articles is very important, for example when using wooden articles as a building material.

It is important that the wood is protected from mould growth, insect attacks etc, as well as it is desirable to prevent the wood from rotting. Further, it is desirable to render the wooden articles more resistant to fire.

It is known in the art to treat cellulosic articles in general, such as wood, with alkaline metal silicates. The aim of such treatment is to give the treated articles a structure resembling that of petrified wood, as petrified wood is known to be very stable over long periods of time.

However, by the conventional methods of treating the wood with sodium silicates, the silicate treatment is easily washed away by water. This is for example especially disadvantageous when the wooden articles are used in a wet environment, such as for example, when the wooden articles are used in marine environments.

In addition some conventional methods of treating wood with silicates provide a coating on the surface of the wood. This is disadvantageous when treating wooden articles as a penetration into the treated article would be desirable and provide better properties of the treated wooden articles.

Thus it would be desirable to provide a silicate treatment for cellulosic articles that is not easily washed away by water, have water repellent properties and better penetration into the treated article.

SUMMARY OF INVENTION

The present invention relates to providing a coating composition system and method for treatment of cellulosic articles with a silicate which gives a water resistant silicate treatment as well as a water repellant product with improved penetration.

It has surprisingly been found that treatment with a combination of (i) potassium silicate, (ii) a alkoxy silane compound and/or siloxane and (iii) a penetration aiding agent, is very efficient in providing the desired treatment of wood.

An object of the present invention is to provide a coating composition system comprising a first and a second aqueous composition.

The present invention provides a first aqueous composition for the treatment of cellulosic articles, having a pH of at least 10 and comprising potassium, wherein the potassium silicate is present in a range of from 1.5 to 32% by weight, the molar ratio of silicon (Si) to potassium (K) of said potassium silicate is 1.2-2.1.

According to one embodiment the molar ratio of Si to K of said potassium silicate of the first aqueous composition is 1.2-1.8, and more preferably 1.3-1.8.

According to one embodiment the pH of the first aqueous composition is at least 10, such as at least 10.5 or at least 10.8.

According to one embodiment the potassium silicate of the first aqueous composition is present in a range of 4-30% by weight.

According to one embodiment the first aqueous composition comprises a penetration aiding agent selected from alcohol(s), ester(s), ether(s), and amine(s) and any combination thereof.

According to one embodiment, when the penetration aiding agent is a polyol, preferably selected from the group diol, triol, tetrol and sugar alcohol and any combination thereof.

According to one embodiment the polyol is selected from acetylenic alcohols, alkylalcohols, and arylalcohols, and any combination thereof.

According to one embodiment when the penetration aiding agent is an ether, preferably a polyether, preferably selected from the group polyethylene glycol (PEG), polypropylene glycol (PPG), polytetramethylene glycol (PTMG), polytetramethylene ether glycol (PTMEG), polyphenyl ether (PPE) and poly(p-phenylene oxide) (PPO), and any combination thereof.

According to one embodiment the first aqueous composition further comprises a surfactant selected from nonionic surfactants, rosin acid and abeitic acid, and their salts, and any combination thereof, preferably the nonionic surfactants are selected from alcohol ethoxylates, alkylphenol ethoxylates, phenol ethoxylates, amide ethoxylates, glyceride ethoxylates (soya bean oil and castor oil ethoxylates), fatty acid ethoxylates, and fatty amine ethoxylates and any combination thereof.

According to one embodiment, depending of the application, the first aqueous composition further comprises a defoamer selected from silicon-free or silicon containing defoamers.

According to one embodiment the cellulosic articles are selected from the group wood, paperboard, fiberboard, paper, living plants, cotton, viscose, parasol fabric, and any combination thereof. Wood may be selected from hardwood or softwood. Soft wood may be selected from pine, ash, hickory, beech, birch, redwood, hemlock, pine, fir, cedar, and spruce.

According to one embodiment the cellulosic articles are selected from the group heat treated wood and hardwood; preferably hardwood comprising a high degree of tannic acid, preferably selected from the group oak, chestnut, mahogany, teak, maple, walnut, and larch wood.

According to one embodiment the first aqueous composition further comprises sodium silicate, preferably in at a ratio of molar concentration of the sodium to potassium of up to 9, more preferably up to 5 and most preferably up to 3.

According to one embodiment the first aqueous composition further comprises a dye and/or a pigment; preferably chosen from the group plant pigments, titanium oxide and iron oxide, preferably selected from titanium dioxide, ferric and ferrous oxides.

According to one embodiment said first aqueous composition further comprises at least one additive selected from the group consisting of plant oil, lignin, and cellulose and any combination thereof; contained in said first composition in a concentration of from 0 to 10% by weight.

One object of the present invention is to provide a coating composition system for treating cellulosic articles comprising:
    at least a first aqueous composition as disclosed herein, and
    at least a second aqueous composition comprising an emulsion of:
    an alkoxy silane compound of the general formula I:

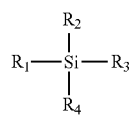

Formula I wherein
    R1 is selected from the group consisting of straight and branched, saturated and unsaturated alkyls and aryls, which group is optionally substituted with aromatic, halogen and/or heteroatom functionalities and organo-functional groups;
    R2 and R3 are independently a straight or branched alkoxy group; and
    R4 is a straight or branched alkoxy group or is selected from the group consisting of straight and branched, saturated and
unsaturated alkyls and aryls, which group is optionally substituted with aromatic, halogen and/or heteroatom functionalities and organo-functional groups;
and/or
a siloxane compound of the general formula II:

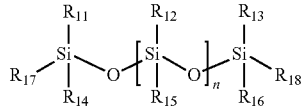

Formula II wherein
    R11, R12, R13, R14, R15 and R16, independently are selected from the group consisting of straight and branched, saturated and unsaturated alkyls and aryls, which group is optionally substituted with aromatic, halogen and/or heteroatom functionalities and organo-functional groups; and
    R17 and R18 are functional groups independently selected from the group consisting of hydroxyl or amino; and
    n is 0-20
and/or
a siloxane compound of the general formula III

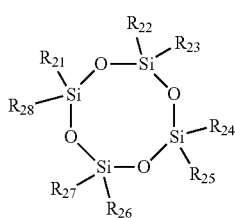

Formula III wherein
    R21, R22, R23, R24, R25, R26, R27 and R28 independently are selected from the group consisting of straight and branched, saturated and unsaturated alkyls and aryls, which group is optionally substituted with aromatic, halogen and/or heteroatom functionalities and organo-functional groups.

According to one embodiment R1 is a branched or straight, saturated or unsaturated $C_{1-18}$-alkyl group, preferably $C_{4-12}$-alkyl group.

According to one embodiment R2, R3 and R4 independently are straight or branched $C_{1-6}$-alkoxy group.

According to one embodiment R11, R12, R13, R14, R15, and R16 independently are branched or straight, saturated or unsaturated $C_{1-6}$-alkyl group, preferably $C_{1-3}$-alkyl group.

According to one embodiment R21, R22, R23, R24, R25, R26, R27 and R28 independently are branched or straight, saturated or unsaturated $C_{1-6}$-alkyl group, preferably $C_{1-3}$-alkyl group.

According to one embodiment the pH of said second composition is at least 5, preferably at least 7, more preferably 7-10, such as 7-8.

According to one embodiment the pH of said second composition is 4-11, preferable 5-10 and most preferable 6-9.5.

According to one embodiment said second composition comprises said alkoxy silane compound and/or siloxane compound(s) in an amount of 0.1 to 60% by weight, preferably 0.3 to 20% by weight, preferably 0.3 to 18% by weight, preferably 0.4 to 15% by weight, preferably 1 to 13% by weight, preferably 2 to 12% by weight, and preferably 2.5 to 12% by weight, of the second composition.

According to one embodiment said alkoxy silane compound and/or siloxane compound(s) are selected from the group consisting of (tri)alkoxysilane and alkylsiloxanes; preferably selected from triethoxyoctylsilane, dimethyl siloxane, and octamethylcyclotetrasiloxane, and any combination thereof.

According to one embodiment the second aqueous composition further comprises a vinyl compound; preferably a vinyl acrylate.

According to one embodiment the vinyl compound is provided to the second aqueous composition in an amount of at most 20% by weight of the second aqueous composition, preferably at most 10% by weight, and more preferably at most 7% by weight of the second aqueous composition.

According to one embodiment the second aqueous composition may further comprise coupling agents which are able to allow silanes which are not that reactive and other components to attach to the surface of the cellulose article. Coupling agents have or is able to obtain at least two reactive sites.

One object of the present invention is to provide method for treating cellulosic articles comprising the steps of:
    providing a cellulosic article;
    providing the coating composition system according to the present invention, including a first and a second aqueous composition; and
    sequentially applying on said cellulosic article the first aqueous composition and the second aqueous composition of said coating composition system.

According to one embodiment the first aqueous coating of the coating composition system is applied using a method selected from pressure impregnation, brush treatment, soaking, dipping, injection and roller coating.

One object of the present invention is to provide use of a kit of parts for the treatment of cellulosic articles, said kit of parts comprising the coating composition system according to the present invention.

One object of the present invention is to provide a cellulosic article comprising the coating composition system according to the present invention or treated by the method the present invention.

DETAILED DESCRIPTION

The present invention provides coating compositions which improves the properties of the coatings on cellulosic materials. The present coating composition system is a kit of compositions that may be used for treating cellulosic articles.

A cellulosic article, such as, but not limited to, wood, fiber board, paper, paperboard, and similar cellulosic materials are suitable for treatment with the compositions of the present invention. Also living plants, such as plant seedlings, can be treated with the compositions of the present invention.

When treating for example a wood article with the first composition, the internal structure of the wood is changed, and the potassium silicate crystallizes in and on the cell walls. The potassium silicate renders wood protection against rot, mould growth and insect attacks, and makes the wood more fire resistant, yielding an artificial petrification of the wood. The potassium silicate crystals thus formed are however water soluble to a certain extent and may be washed away by extensive washing with water. However, in addition to the silification of the cellulosic article, the potassium silicate treatment also opens up the structure of the cellulosic article, such as wood.

The first composition is able to better penetrate the cellulosic material it is applied to. The present composition is able to provide a coating with better adhesion, long-term effect and look compared to conventional coating compositions. It is also to be noted that cellulosic materials which normally are very hard to coat in a sufficient and satisfying manner are able to be coated with the composition according to the present invention with a very good end result e.g. in terms of penetration and long term adhesion.

In addition, the composition further reduces or eliminates interaction between or polymerisation of silicon containing monomers of the composition. The first composition includes chemicals with hydrogen bonding features. Monomers of the silicate are hydrogen bonded to penetration aiding agents and thus reduce the amount of silicate ions reacting together. The formed hydrogen bonded complex penetrates the wood and is thereafter hydrogen bonded with the cellulose.

If surface active agents are present in the first composition they may be able to lower the surface tension and/or aid in the emulsification of the hydrophobic and hydrophilic phases of the first composition. Preferably nonionic surfactants are used for this purpose. This may also provide a lowered sedimentation rate.

Defoamers may be used in the first composition as a high amount of foaming may influence the appearance of the final product. The use of defoamers may be especially interesting for industrial coating application.

Thickeners may be used in the first and/or second coating composition. If they are used in the first coating composition, the penetration into the cellulosic material becomes poorer, however the amount coating applied to the cellulosic material may increase per application and thus provide a good protection.

The silicon to potassium ratio of the potassium silicate is preferably quite low. This benefit the penetration into the cellulosic article applied with the composition. The present composition provides an increased amount of accessible monomer. Also, the amount of basic materials provides a more opened pore structure of the cellulosic material and aids in the penetration of the silicate material.

Pigments may be provided to the first aqueous composition. Such pigments may be inorganic and/or organic. Examples of pigments are titanium oxides and iron oxides. Examples are $TiO_2$, FeOOH, $Fe_2O_3$, $Fe_3O_4$ and any combination thereof. In one embodiment titanium dioxide of very small particle size is preferable, such as a size of at most 400 nm, preferably at most 350 nm, in diameter.

The composition of the first composition aims at reducing or elimination bubble formation in the pores of the cellulosic material.

Silica acid sols may be present in the first and/or second aqueous coating compositions. Silica sols are stable and contain substantially spherical, discrete, non-agglomerated, dense particles of amorphous silica ($SiO_2$). In the first and/or second composition silica sols having a diameter of about 2-200 nanometer (nm), such as 3-100 nm or 4-40 nm may be present. The use of sols in the coating compositions results in a harder and more resistant surface of the cellulosic article. One specific type of silica sols that may be used are silica sols with organic substance(s) attached to the sols hydroxy groups (—OH) on the surface of the sols. Such sols may be found on the surface of the coating(s). Preferably the sols are bound in and locked in the coating e.g. by application of the second aqueous coating composition.

In one embodiment the silica sols are based on polymerised silicates. On the surface of such sols the hydroxy groups thereon may have been reacted with e.g. silanes or other materials. However, such materials may be pH sensitive and upon a too high pH the sols are at least partially dissolved and/or groups attached to the sols by reaction are detached by a reversed reaction. That causes an increase in viscosity. Thus, silica sols sensitive to high pH may preferably be used in the second aqueous coating composition. Introduction of silica sols in the second coating composition provides an increased protection against fouling of the surface.

As a second step, the second aqueous composition, comprising the emulsion of the alkoxy silane and/or siloxane, is applied on the potassium silicate treated article. As the potassium silicate treatment has opened up the structure, the alkoxy silane compound is able to diffuse into the treated article to a larger extent than it would have done in a non-treated article. When in contact with the silicate crystals, the alkoxy silanes may polymerise, forming big polysilane networks with pendant alkoxy groups. These non-polymerised alkoxy groups then reacts, presumably via a condensation reaction, to hydroxyl groups of molecules (such as hydroxyl groups of cellulose and silicates) in the wood article. The formed polysilane network is strongly water repellant, thus yielding an at least partly covalently bonded water impregnation to the wood. Further, the formed network of polysilanes formed from the second composition physically (sterically) locks the silicates from the first composition in the wood structure preventing the silicate treatment to be washed away. Thus, the option to use the two aqueous compositions (i.e. the potassium silicate containing first composition and the silane containing second composition) provides a synergy effect where (i) the silane compound penetrates deep into the wood due to that the silicate treatment have opened up the wood structure, yielding a thorough waterproofing to the wood; (ii) the formed silane network locks the silicate treatment inside the wood structure, so that this silicate treatment cannot easily be washed out from the wood; and (iii) the silicate provides a hard structure on the surface which locks the silane network on the surface. The silanes are activated by the alkali and react with bonds on silica particles and on the cellulose surface. The result is a cellulose article being stabilized and water resistant for liquid water by the silicate treatment. Steam, which contains water in gaseous form, which may be present in air is able to pass freely through any coatings of the present invention. The molar ratio Si:K is important and determines whether the silicate exists predominantly in monomer form, dimer form, trimer form or larger forms, where a low ratio indicates more of the monomer form, and a high ratio indicates more of the larger forms. The monomer form of the silicate is the physically smallest form of the silicate possible.

In the present invention it is preferred to have a high percentage of silicates in monomer form, which here have been found to exhibit better penetration in the wood structure, and better abilities to form silicate crystals in or near the cell walls of wooden structures, giving a better silicate treatment.

In the second composition there is a silicon based binder structure. Silicon based polymers and monomers are interacting in forming a network. The second composition may comprise additional components to further strengthen the properties of the second composition and/or add additional properties to it.

The second composition comprises silanes and/or siloxanes which may be polymerisable. These compounds are able to provide a surface coating which is in some aspects considered porous and able to allow certain components to migrate through the coating.

The second coating composition is able to provide a water repellant effect, even immediately after application. The structure of the second composition provides a coating with hydrophobic organic tails at the surface. The coating is to be penetratable for gaseous water but not for liquid water. Thus, the coating allows the cellulosic material to breathe or regulate moisture content and at the same time stop other larger components like liquid water from penetrating the coating layer.

The second composition may contain an additional polymer binder, which may aid to bind the surface of the coating better. Such an additional binder may be a vinylic compound. The vinylic compound makes the second coating a little bit less penetratable for steam i.e. gaseous water. Thus, it is important not to add to much vinyl compound as the coating would become too dense/non-penetrating for gaseous water. However, the use of vinyl compound increases the binding of the coating and provides a surface that is more durable and easier to clean.

The second coating composition may comprise biocides in order to increase the shelf life and lifetime of the composition and applied coating.

The second composition coating is also able to fix cellulose and other particles, if they are present in the second composition or in contact with the second composition coating.

In the second composition pigments such as those mentioned for the first composition may also be included. Application of pigments in the second composition preferably uses titanium dioxide of very small particle size, as such also strengthen the surface and provides a UV protection. A suitable small particle size is at most 400 nm, such as at most 350 nm, or at most 300 nm, in diameter.

Pigments applied to the second coating composition may provide better coverage.

One object of the present invention is to provide a first aqueous composition for the treatment of cellulosic articles, having a pH of at least 10 and comprising potassium silicate, wherein the potassium silicate is present in a range of from 1.5 to 32% by weight, the molar ratio of silicon (Si) to potassium (K) of said potassium silicate is 1.2-2.1.

The molar ratio of Si:K may be at most 2.1, such as at most 1.8, at most 1.65, or at most 1.6.

In one embodiment the molar ratio of Si to K of said potassium silicate of the first aqueous composition is at least 1.2, such as at least 1.3. Thus, ratios of Si to K in the potassium silicate may be 1.2-2.1, such as 1 1.2-2.0, 1.2-1.9, 1.2-1.8, 1.3-1.8, 1.2-1.65, 1.3-1.65, 1.2-1.6 or 1.3-1.6.

At lower ratios below 1.2 the penetration of the coating into the cellulosic material is high but it has been found to have a large negative impact on the wood. Lignin seems then to be oxidized by reaction with oxygen from the air in the same way as in oxygen bleaching, e.g. as in the cellulose industry. The alkalinity of the coating product aids dissolution oxidized lignin. Some of this lignin was keeping the fibers of the cellulosic material together and, thus, there will be loss of fibers from the surface. The second coating composition aids in protecting the cellulosic material from water on the surface, water repellency, but this effect is also lost or decreased since the coating is to be applied on the affected fibers. A loss of fibers influences the action of the complete coating system. Thus, a ratio below 1.2 is not desirable according to the present invention.

These ratios are based on the potassium silicate alone. The first aqueous composition may contain a different molar ratio silicon to potassium in total, e.g. due to addition of other compounds containing Si or K. In an embodiment of the present invention the molar ratio of Si:K of the first aqueous composition, in total, may be at most 3, such as at most 2.5, at most 2.1, at most 1.65, or at most 1.6.

The potassium silicate may be present in the first aqueous composition as a solution, as it is known by those skilled in the art, a value of at most 2 of the Si:K-ratio, provides a solution. The form may also depend to a certain extent on the concentration of potassium silicate in the composition. Potassium silicate in solution exists in the form of monomers, dimers, trimers, or larger forms (where monomer is one $SiO_2$-unit per one $K_2O$-unit and a trimer is three $SiO_2$-units per one $K_2O$-unit). The Si:K molar ratio affects the relative proportions of these forms and a lower ratio corresponds to a higher degree of monomers.

The pH of the first aqueous composition is at least 10, e.g. at least 10.3, at least 10.5, or at least 10.8. The pH of the first aqueous composition may have an upper limit of the pH of at most 13, such as at most 12.9 or 12.8. Thus, the pH ranges may be about 10-13, 10.5-12.9 or 10.5-12.8. Such high pH values prevent the first composition from gel forming, and help to keep the composition as a stable solution during storage and avoid gelling. Further, at the desired pH values, certain additional, optional, components in the composition, such as lignin and resins, are easily dissolved, promoting the penetration of such components in to the treated article. The desired high pH provides suitable reaction conditions and promotes reaction of further components, such as the reaction and possible polymerisation of silanes and/or siloxanes which are present in the second aqueous composition.

The first aqueous composition comprises potassium silicate in a range of 1.5-32% by weight, such as 1.5-30 wt %, 4-30 wt %, 10-30 wt % 2-20 wt %, or 2-18 wt %, of the first aqueous composition. For concentrations below this range, adequate penetration of the silane of the second composition may not be obtained. For concentrations above this range, adequate penetration of the potassium silicate may not be obtained. It is to be noted that for some applications the first aqueous composition comprises potassium silicate in a range of about 2-7% by weight, of the first aqueous composition; and for some applications the first aqueous composition comprises potassium silicate in a range of about 8-20% by weight, of the first aqueous composition.

The first aqueous composition may comprise a penetration aiding agent selected from alcohol(s), ester(s), ether(s), and amine(s) and any combination thereof.

The penetration aiding agent of the first aqueous composition is preferably a compound which is capable of hydrogen bonding to the silica. By hydrogen bonding to the silica the amount of silica monomers present in the composition is improved as polymerisation and crosslinking of the silica monomers is reduced to some extent, which in turn leads to a better penetration of the material into the cellulosic article.

According to one embodiment, when the penetration aiding agent of the first aqueous composition is an alcohol it preferably is a polyol. Suitable polyols may be selected from the group diol, triol, tetrol, and sugar alcohol, and any combination thereof. The specific alcohols mentioned below may be used alone or used in any combination.

In one embodiment the polyol may be selected from acetylenic alcohols, alkylalcohols, and arylalcohols, and any combination thereof.

Diols may be selected from the group acetylenic diols, alkylalcohols, and arylalcohols, and any combination thereof. Examples of diols that may be suitable may be selected from the group bisphenol A, etanediol, propanediol, butanediol, and pentanediol and any combination thereof. Specific diols thereof may be selected from 2-methyl-2-propyl-1,3-propanediol, 3-oxa-1,5-pentanediol, 2,4,7,9-tetramethyl-5-decindiol (TMDD), 1,2-etanediol, 1,3-propanediol, 1,2-propanediol, 2,2-propanediol, 1,4-butanediol, 1,5-pentanediol.

Triols may be selected from glycerol, butane trihydroxide and benzenetriol.

Sugar alcohols may be selected from the group glycerol, erythritol, threitol, arabitol, xylitol, bibitol, mannitol, sorbitol, galactitol, fucitol, iditol, inositol, volemitol and hydrogenated starch hydrolysates (HSHs) and any combination thereof.

According to one embodiment, when the penetration aiding agent of the first aqueous composition is an ether, the ether preferably is a polyether. The polyether may be selected from the group polyethylene glycol (PEG), polypropylene glycol (PPG), polytetramethylene glycol (PTMG), polytetramethylene ether glycol (PTMEG), polyphenyl ether (PPE) and poly(p-phenylene oxide) (PPO), and any combination thereof.

The first aqueous composition may comprise the penetration aiding agent in equimolar amounts in relation to the amount of low molecular weight silica, i.e. silica monomers.

The first aqueous composition may comprise the penetration aiding agent in an amount of at least 0.01% by weight, such as 0.05-30 wt %, 0.1-25 wt %, 0.1-15 wt %, 0.01-5 wt %, 0.02-5 wt %, 0.01-1 wt %, 0.025-1 wt % or 0.01-0.025 wt % of the first aqueous composition.

The penetration aiding agent promotes the diffusion of the composition into the article.

According to one embodiment the first aqueous composition further comprises a surfactant selected from nonionic surfactants, rosin acid and abeitic acid, and the salts of the rosin acid or abeitic acid, and any combination thereof. Suitable nonionic surfactants are selected from alcohol ethoxylates, alkylphenol ethoxylates, phenol ethoxylates, amide ethoxylates, glyceride ethoxylates (soya bean oil and castor oil ethoxylates), fatty acid ethoxylates, and fatty amine ethoxylates and any combination thereof. Specific alcohol ethoxylates may be selected from alkyl alcohol ethoxylates having a carbon length of at least 6 carbons (C6), such as C6-C20, C8-C18, C10-C18 or C12-C16. Preferably the ethyleneoxide part (EO) of the alkyl alcohol ethoxylates has 2-12 EO, such as 3-10 EO, 4-10 EO. Alcohol ethoxylates may be selected from C6-C20 with 2-12 EO. Preferably nontoxic and environmentally friendly surfactants are used.

According to one embodiment additional additives like emulsifying agents may be added such as sulphates (e.g. 2-hexyldecylsulphate) and sulphonates.

According to one embodiment the first aqueous composition may further comprise a defoamer selected from silicon-free or silicon containing defoamers.

According to one embodiment the cellulosic articles may be selected from the group wood, paperboard, fiberboard, paper, living plants and any combination thereof. The cellulosic articles may be selected from the group heat treated wood and hardwood, preferably hardwood comprising a high degree of tannic acid, preferably selected from the group oak, chestnut, mahogany, teak, walnut, and larch wood.

The heat treated wood may have been subjected to heat for different reasons. Heat treatment may be performed to a partial pasteurization in order to reduce or eliminate the amount of living organisms in the wood or reduce the moisture content of the wood in a controlled environment e.g. to reduce warping.

According to one embodiment the first aqueous composition further comprises other silicates such as sodium silicate. If other silicates than potassium silicate are present in the composition they are found in different amounts.

According to one embodiment at least 70% by weight, such as at least 80% by weight, at least 90% by weight, or at least 95% by weight percent of the alkali silicate content is constituted by potassium silicate.

According to one embodiment the first aqueous composition may comprise sodium silicate in addition to the potassium silicate, preferably in at a ratio of molar concentration of the sodium to potassium of 0 to 9, more preferably 0 to 5 and most preferably 0 to 3. For example, the ratio of the sodium to potassium may be at least 0.001 such as 0.02 or 0.04. Thus the ratio may be 0.001-9, 0.002-5, 0.004-3, 0.001-0.5, 0.002-0.1, or 0.002-0.006.

According to one embodiment the first aqueous composition may further comprise a dye and/or a pigment. Such may be selected from the group titanium oxide and iron oxide, preferably selected from titanium dioxide, ferric and ferrous oxides. Plant pigments may be used. Dyes or pigments may be present in said first composition in a concentration of from 0 to 10% by weight.

According to one embodiment said first aqueous composition further comprises at least one additive selected from the group consisting of plant oil, lignin, and cellulose. These may be present in said first composition in a concentration of from 0 to 10% by weight. Such additives enhance the effect of the silicate treatment by the first composition on cellulosic articles. Lignin provides in combination with the potassium silicate petrification of wood structures. Finely ground cellulose and/or (plant) pigments increase the active area inside the coated cellulose article.

One object of the present invention is to provide a coating composition system for treating cellulosic articles comprising:

at least a first aqueous composition according to the present invention disclosed above, and at least a second aqueous composition comprising an emulsion of:

a alkoxy silane compound of the general formula I:

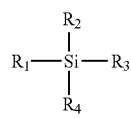

Formula I wherein

R1 is selected from the group consisting of straight and branched, saturated and unsaturated alkyls and aryls, which group is optionally substituted with aromatic, halogen and/or heteroatom functionalities and organo-functional groups;

R2 and R3 are independently a straight or branched alkoxy group; and

R4 is a straight or branched alkoxy group or is selected from the group consisting of straight and branched, saturated and unsaturated alkyls and aryls, which group is optionally substituted with aromatic, halogen and/or heteroatom functionalities and organo-functional groups and/or a siloxane compound of the general formula II:

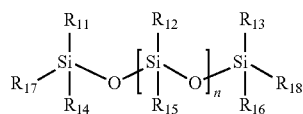

Formula II wherein

R11, R12, R13, R14, R15 and R16, independently are selected from the group consisting of straight and branched, saturated and unsaturated alkyls and aryls, which group is optionally substituted with aromatic, halogen and/or heteroatom functionalities and organo-functional groups; and R17 and R18 are functional groups independently selected from the group consisting of hydroxyl or amino; and n is 0-20 and/or a siloxane compound of the general formula III

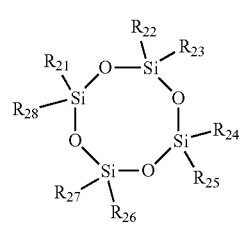

Formula III wherein

R21, R22, R23, R24, R25, R26, R27 and R28 independently are selected from the group consisting of straight and branched, saturated and unsaturated alkyls and aryls, which group is optionally substituted with aromatic, halogen and/or heteroatom functionalities and organo-functional groups.

According to one embodiment $R^1$ is a branched or straight, saturated or unsaturated $C_{1-18}$-alkyl group, preferably $C_{4-12}$-alkyl group. The $R^1$ group plays a major role in the degree of hydrophobicity of the resultant polysilane network. Thus, it is preferred that $R^1$ is a hydrophobic group, such as for example a $C_{4-12}$-alkyl group, such as $C_8$. Such alkyls may optionally be substituted with aromatic groups, for example phenyl; halogen atoms, such as F, Cl, Br, I; hetero atoms, such as O, N, S, P; and other functionalities known to those skilled in the art.

Typically, $R^1$ is a non-hydrolyzable group, i.e. a group that cannot be cleaved off the Si-atom by hydrolysis. Good results have been shown for $R^1$ being n-octyl. The $R^1$ group may also, in a subsequent step be used for coupling other chemical compounds silanes, for example for coupling paints and lacquers to the article. For promoting such coupling, the $R^1$ group may further be substituted with an organo-functional group, for example amino, benzylamino, methacrylate, vinylbenzylamino, epoxy, chloropropyl, melamin, vinyl, ureido, mercapto, disulfido and tetrasulfido group. Preferably, such functionality is located near or at the end of the $R^1$ group distant from the Si-atom. For example, an acrylate based paint or lacquer would be suitable for use on such a silane having a $R^1$— group being substituted with an amino, methacrylate or epoxy functionality. Other combinations of paints/lacquers and $R^1$-functionalities are known to those skilled in the art According to one embodiment $R^2$, $R^3$ and $R^4$ independently are straight or branched $C_{1-8}$-alkoxy group. Examples of groups denoted $R^2$, $R^3$ or $R^4$ includes straight or branched alkoxy groups, i.e. an alkyl group bound to the Si-atom via an oxygen atom (Si—O-Alkyl). The groups $R^2$, $R^3$ and $R^4$ may be selected independently from each other, i.e. $R^2$ can be different from $R^3$ and or $R^4$. Examples of $R^{2-4}$ groups suitable in the present invention include, for example straight and branched $C_{1-6}$-alkyls, such as $C_{1-4}$-alkyls, unsaturated variants thereof, and such alkyls optionally substituted with aromatic groups, for example phenyl; halogen atoms, such as F, Cl, Br, I; hetero atoms, such as O, N, S, P; and other functionalities known to those skilled in the art. Good results have been shown for $R^{2-4}$ being ethyl. When a polymerisation process is performed, the alkoxy groups are released as alcohols. As the reaction environment is an aqueous solution, it is therefore advantageous that the released alcohols are readily water soluble. Thus it is preferred that $R^2$, $R^3$ and $R^4$ for example are methoxy (forming methanol), ethoxy (forming ethanol) or propoxy (forming propanol). In addition $R^4$ may also be selected from the groups described for $R^1$ above. Two or more different silane compounds of the general formula (I) may be comprised in the same composition. In one example, a first silane of formula (I) where $R^2$, $R^3$ and $R^4$ independently are alkoxy-groups may be mixed with a second silane of formula (I) where $R^1$ and $R^4$ is a selected from the groups described also for $R^2$ and $R^3$ is selected from the group consisting of straight and branched, saturated and unsaturated alkyls, optionally substituted with aromatic, halogen and/or heteroatom functionalities. In such a mixture of silanes, the first silane predominantly provides the strong binding to the hydroxyl groups of the cellulosic article, in order to bind the silane to the article, whereas the second silane provides a stronger effect as provided by the $R^1$ and $R^4$, for example water repellant effect. The ratio between the first and the second silane is selected on the basis of the propertied desired by the treated cellulosic article.

As an example, an article treated with a silane comprising an amino-functional $R^1$— group is well suited for being painted on with an acrylic based paint. The acrylic polymers in the paint will form covalent bonds with the aminofunctions on the silanes. As the silanes in turn will bind covalently to the potassium silicate and the cellulose, the acrylic based coating will be strongly bonded to the article. Other such combinations between coating components and organofunctional groups will be apparent to those skilled in the art.

According to one embodiment R11, R12, R13, R14, R15, and R16 of said siloxane according to Formula II may independently be branched or straight, saturated or unsaturated $C_{1-6}$-alkyl group, preferably $C_{1-3}$-alkyl group. Examples may be methyl, ethyl, ethenyl, ethynyl, propyl, propenyl, propynyl.

According to one embodiment n may be 0-15, such as 0-10, 0-8, 0-5, 1-8, or 1-5.

According to one embodiment R21, R22, R23, R24, R25, R26, R27 and R28 independently are branched or straight, saturated or unsaturated $C_{1-6}$-alkyl group, preferably $C_{1-3}$-alkyl group. Examples may be methyl, ethyl, ethenyl, ethynyl, propyl, propenyl, propynyl.

According to one embodiment the pH of said second composition is at least 5, such as at least 7 or at least 9.

According to one embodiment said second composition comprises at least one of said alkoxy silane compound according to Formula I, the siloxane compound according to Formula II and the siloxane compound according to Formula III, and any combination thereof, in a range of 0.1 to 60% by weight, such as 0.3-20%, 0.3-18%, 0.4-15%, 1-13%, 2-12%, or 2.5-12% by weight of the second composition.

According to one embodiment said second aqueous composition comprises at least one of said alkoxy silane compound according to Formula I, the siloxane compound according to Formula II and the siloxane compound according to Formula III, which may be selected from the group (tri)alkoxysilane and alkylsiloxanes, such as triethoxyoctylsilane, dimethyl siloxane, octamethylcyclotetrasiloxane.

The alkoxy silanes and siloxanes according to the present invention may be selected from polymerised, polymerisable and non-polymerisable compounds.

Use of non-polymerisable silanes or siloxanes may increase the water proofing effect rendered by the second composition. When added onto the cellulosic article, the non-polymerisable alkoxy silanes and/or siloxanes form a protective surface layer, which immediately provides water proofing to the article. As the reaction within the article (i.e. the polymerisation of the silane and/or siloxane network and the condensation to covalently bind the silane and/or siloxane network to the cellulose) is a slow reaction at ambient temperatures, it is important to provide an immediate waterproofing, enabling the silane-cellulose-silicate structures to form.

The compound n-octyltriethoxysilane may be used to further increase the water-repelling properties and is preferably used in an amount of 0.5-15% by weight, such as 0.5-12 wt %, 5-15 wt %, 2-12 wt %, 3-11 wt %, or 7-12% by weight, of the second aqueous composition.

Examples of the siloxanes that may be used in the second composition may be selected from the group n-octyl silsesquioxane ethoxy- and hydroxy-terminated; and dimethyl siloxane with aminoethylaminopropyl silsesquioxane, hydroxy terminated.

Examples of the silanes that may be used in the second composition may be selected from the group triethoxyoctylsilane and methoxyoctyl silane.

According to one embodiment the second aqueous composition further comprises a vinyl compound, preferably a vinyl acrylate. Such an additional components increase the water proofing effect rendered by the second composition According to one embodiment the vinyl compound is provided to the second aqueous composition in an amount which is less than the amount of the alkoxy silane compound of the general formula I and/or the siloxanes according to Formulas II and III of the second aqueous composition.

According to one embodiment the vinyl compound is provided to the second aqueous composition in an amount of at most 20% by weight of the second aqueous composition, such as at most 10% or at most 7% by weight of the second aqueous composition.

According to one embodiment the main portion (i.e. greater than 50%, such as greater than 70%, or more than 90%) of a solvent in the working compositions (the first or second aqueous composition) is water.

According to one embodiment a solvent, which may be mainly water, is present in the working compositions (the first and/or second aqueous compositions) in an amount of about 50-94% by weight of aqueous composition, which may be either the first or the second composition. Both compositions may have similar solvent content.

According to one embodiment the second aqueous composition may comprise wax. The wax may be present in an amount of about 0-10%, such as 0.5-7%, by weight of the second composition.

It shall be noted that the second aqueous composition in one embodiment does not contain any silicate. The second aqueous composition is relatively stable in emulsified form and at normal storage conditions.

There are several advantages of supplying the silane in form of an emulsion in water. For example, the emulsion in water essentially obviates the use of organic solvents, thus making the inventive composition more environmentally friendly, as water may be used as the carrier of the emulsion. Further, water is a solvent obtainable at a low cost. When the second, silane and/or siloxane containing, composition is applied on the cellulosic article treated as mentioned above, it comes in contact with the crystallized potassium silicate provided. This crystallized surfaces act as a catalyst for a polymerisation reaction in order to form a polysilane network and/or polysiloxane network inside the article. Not to be bound to any specific theory, a conceivable reaction path is provided below. By hydrolysis, the alkoxy groups $R^2$-$R^4$ are cleaved off the Si-atom as the alcohols of the alkoxy groups, leaving a reactive silanetriol, $R^3$—$Si(OH)_3$. Via a condensation reaction, the silanetriol polymerises. The surfaces (inner and outer) of the cellulosic article exhibit a plurality of pendant hydroxyl groups, mainly originating from the cellulose and hemicellulose. These cellulose hydroxyl groups form hydrogen bonds with non-reacted hydroxyl groups on the polymerised silanetriols. Via application of heat, these hydroxyl-hydroxyl hydrogen bonds are via condensation converted to covalent bonds between the cellulose and the silane polymer. Without application of heat, this condensation is a rather slow process. The formation of the silane network in the silicate treated article leads to that the silicate is physically hindered from being washed out from the article. As will be realized, when the first composition comprises such additives as finely ground cellulose, the alkoxy silane will also bind to this cellulose, which greater than thus provides a reinforcement of the article. The reaction path described above is also valid for the reaction between the crystallized potassium silicate and the alkoxy silane. Also this potassium silicate has pendant hydroxyl (—OH) groups to which the silane covalently binds. Thus, the silicate is both covalently bound to the silane network as well as sterically held within the article.

The combination of the silicate treatment and the silane treatment of the cellulosic articles truly gives synergy effects. First, the silane compound itself does not have the ability to diffuse very deep into the structures (typically only about 1 to 1.5 mm in wood). However, the silicate treatment "opens up" the structure and thus, the silane compound has the ability to confer a more deep effective water-proofing (typically 2 to 3 mm or more). Hence, the depth of the water-proofing is increased by up to 100% or more. This is for example advantageous in high wear application, where the article is subject to substantial wear and tear. In such applications it is desirable to have a deep effective protection as a too shallow treatment calls for re-treatment at an undesired frequency. Secondly, the silane networks locks the otherwise water soluble potassium silicate crystals inside the treated article, so that the protection conferred by the potassium silicate treatment is stabilized. The silane treatment protects the potassium silicate crystals from water, so that they are not washed away by water.

One object of the present invention is to provide a method for treating cellulosic articles comprising the steps of:

providing a cellulosic article;

providing the coating composition system according to the present invention, including a first and a second aqueous composition; and sequentially applying on said cellulosic article the first aqueous composition and the second aqueous composition of said coating composition system.

The present invention relates to a method for treating cellulosic articles wherein the cellulosic article is first applied with the first aqueous coating, followed by application of the second aqueous composition. Typically, after the first composition is applied on the cellulosic article, the article is allowed to dry to a reasonable extent before the second composition is applied on the surface.

According to one embodiment the first aqueous coating of the coating composition system is applied using a method selected from pressure impregnation, brush treatment, soaking, dipping, spraying, injection and roller coating. If brush or spray application is used it is preferable to use a Si:K ratio of 1.2-1.4, e.g. 1.3-1.4, to facilitate penetration into the cellulosic structure of the material applied. If the first coating composition is applied multiple times, the Si:K ratio of the subsequent first coating compositions may have a slightly higher ratio such as Si:K about 1.4-2.0, e.g. 1.5-1.9. If pressure impregnation is used low Si:K ratios are preferable, such as 1.2-1.4, e.g. 1.3-1.4. Any subsequent coating of a pressure impregnated surface may use a composition having the same or slightly higher ratio such as 1.4-2.0, e.g. 1.5-1.9.

One object of the present invention is to use of a kit of parts for the treatment of cellulosic articles, said kit of parts comprising the coating composition system according to the present invention.

One object of the present invention is to provide a cellulosic article comprising the coating composition system according to the present invention.

One object of the present invention is to provide a cellulosic article treated by the method according to the present invention.

Typically, the present invention provides solutions to rendering said cellulosic article more resistant to the elements, such as water, wind, and temperature. The treatment of the article with potassium silicate provides several properties to the article, such as fire resistance, mould growth resistance, prevention of insect attacks, UV-protection, as the crystals absorbs and reflects light of UV-wavelengths. Also the potassium silicate crystals form a blocking means against volatile organic compounds.

Examples

Tests have shown that lowering the ratio provides an improvement in the amount of coating impregnated into the cellulosic material, see Table 1 below. In the tests pressure impregnated deck boards were applied with the first coating composition according to the invention.

TABLE 1 relative amount impregnated into cellulosic article

| Ratio Si:K | Relative amount of first coating composition impregnated into wood |
|---|---|
| 1.6 | 1 |
| 1.5 | 1.1 |
| 1.4 | 1.3 |

Cellulosic articles that have been subjected to a pressure impregnation with a composition comprising copper and other chemicals can be protected with a treatment according to the present invention. By treating according to the invention in the provided two step manner increased lifetime of the wood by reduction of the leakage of copper and the other chemicals is obtainable. The copper is often provided as a carbonate hydroxide and is alkaline. Surprisingly, in combination with the alkaline first aqueous composition and the second composition there is a reduction in the leakage of copper with the present treatment.

Further tests have shown that lowering the ratio provides an improvement in the amount of coating impregnated into the cellulosic material, see Table 2 below. In the tests untreated pine wood was used and the first coating composition according to the invention was applied thereto using underpressure impregnation.

TABLE 2

Weight percentage increase of impregnated pine articles at different molar ratios.

| Ratio Si:K | Weight percentage increase of the impregnated pine boards (wt %) |
|---|---|
| 1.96 | 4.2 |
| 1.6 | 5.7 |
| 1.4 | 13 |

Tests have also been performed using penetration aiding agent in the first coating composition. Table 3 below discloses the results of spruce being treated with the first coating composition with and without penetration aiding agent. The amount of coating absorbed by the spruce increases with penetration aiding agent. The first coating composition had a molar ratio of the potassium silicate of 1.4. The coating composition was mixed with water before application. 3 parts water was mixed with 1 part of the first coating composition. The amount of penetration agent used was 0.7 wt % of a diol, (2,4,7,9-tetramethyl-5-decindiol (TMDD)).

TABLE 3

Weight increase of impregnated spruce with and without penetration aiding agent.

| | Weight increase of the impregnated spruce wood (g/m$^2$) |
|---|---|
| Without TMDD | 270 |
| With TMDD | 314 |

The penetration aiding agent further improves the effect of the first coating composition applied to cellulosic articles.

The invention claimed is:

1. A coating composition system for treating cellulosic articles comprising:
    at least a first aqueous composition having a pH of at least 10 and comprising potassium silicate, wherein the potassium silicate is present in a range of from 1.5 to 32% by weight, the molar ratio of silicon (Si) to potassium (K) of said potassium silicate is 1.2-2.1, and
    at least a second aqueous composition comprising an emulsion of:
    an alkoxy silane compound of the general formula I:

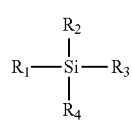

Formula I wherein
    R1 is selected from the group consisting of straight and branched, saturated and unsaturated alkyls and aryls, which group is optionally substituted with aromatic, halogen and/or heteroatom functionalities and organo-functional groups;
    R2 and R3 are independently a straight or branched alkoxy group; and
    R4 is a straight or branched alkoxy group or is selected from the group consisting of straight and branched, saturated and unsaturated alkyls and aryls, which group is optionally substituted with aromatic, halogen and/or heteroatom functionalities and organo-functional groups;
    and/or
    a siloxane compound of the general formula II:

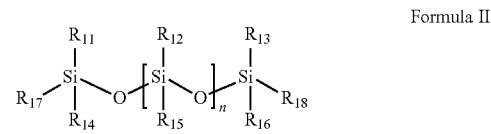

Formula II wherein
    R11, R12, R13, R14, R15 and R16, independently are selected from the group consisting of straight and branched, saturated and unsaturated alkyls and aryls, which group is optionally substituted with aromatic, halogen and/or heteroatom functionalities and organo-functional groups;
    R17 and R18 are functional groups independently selected from the group consisting of hydroxyl or amino; and
    n is 0-20;
    and/or
    a siloxane compound of the general formula III

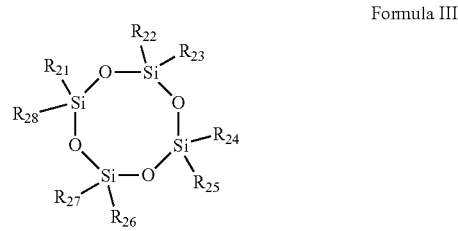

Formula III wherein
    R21, R22, R23, R24, R25, R26, R27 and R28 independently are selected from the group consisting of straight and branched, saturated and unsaturated alkyls and aryls, which group is optionally substituted with aromatic, halogen and/or heteroatom functionalities and organo-functional groups.

2. The coating composition system according to claim 1, wherein the molar ratio of Si to K of said potassium silicate of the first aqueous composition is between 1.2 and 1.8.

3. The coating composition system according to claim 1, wherein the potassium silicate of the first aqueous composition is present in a range of 4-30% by weight.

4. The coating composition system according to claim 1, further comprising a penetration aiding agent selected from alcohol(s), ester(s), ether(s), and amine(s), and any combination thereof.

5. The coating composition system according to claim 1, wherein the first aqueous composition further comprises a surfactant selected from nonionic surfactants, rosin acid and abeitic acid, and their salts, and any combination thereof.

6. The coating composition system according to claim 1, wherein the first aqueous composition further comprises sodium silicate.

7. The coating composition system according to claim 1, wherein R$_1$ is a branched or straight, saturated or unsaturated C$_{1-18}$-alkyl group.

8. The coating composition system according to claim 1, wherein $R_2$, $R_3$ and $R_4$ independently are straight or branched $C_{1-6}$-alkoxy group.

9. The coating composition system according to claim 1, wherein R11, R12, R13, R14, R15, and R16 independently are branched or straight, saturated or unsaturated $C_{1-6}$-alkyl group.

10. The coating composition system according to claim 1, wherein R21, R22, R23, R24, R25, R26, R27 and R28 independently are branched or straight, saturated or unsaturated $C_{1-6}$ alkyl group.

11. The coating composition system according to claim 1, wherein said second composition comprises said alkoxy silane compound and/or siloxane compound(s) in an amount of 0.1 to 60% by weight, of the second composition.

12. The coating composition system according to claim 1, wherein said alkoxy silane compound and/or siloxane compound(s) are selected from the group consisting of (tri) alkoxysilane and alkylsiloxanes.

13. The coating composition system according to claim 1, wherein the second aqueous composition further comprises a vinyl compound.

14. A method for treating cellulosic articles comprising the steps of:
providing a cellulosic article;
providing the coating composition system according to claim 1, including a first and a second aqueous composition; and
sequentially applying on said cellulosic article the first aqueous composition and the second aqueous composition of said coating composition system.

15. The method according to claim 14, wherein the first aqueous coating of the coating composition system is applied using a method selected from pressure impregnation, brush treatment, soaking, spraying, dipping, injection and roller coating.

16. Cellulosic article comprising the coating composition system according to claim 1.

17. Cellulosic article treated by the method according to claim 14.

18. The coating composition system according to claim 2, wherein the molar ratio of Si to K of said potassium silicate of the first aqueous composition is 1.2-1.65.

19. The coating composition system according to claim 2, wherein the molar ratio of Si to K of said potassium silicate of the first aqueous composition is 1.3-1.65.

20. The coating composition system according to claim 4, wherein the penetration aiding agent is a polyol selected from the group diol, triol, tetrol and sugar alcohol, and any combination thereof.

21. The coating composition system according to claim 5, wherein the nonionic surfactants are selected from alcohol ethoxylates, alkylphenol ethoxylates, phenol ethoxylates, amide ethoxylates, glyceride ethoxylates (soya bean oil and castor oil ethoxylates), fatty acid ethoxylates, and fatty amine ethoxylates and any combination thereof.

22. The coating composition system according to claim 6, wherein the first aqueous composition further comprises sodium silicate in a ratio of molar concentration of the sodium to potassium of up to 9.

23. The coating composition system according to claim 6, wherein the first aqueous composition further comprises sodium silicate in a ratio of molar concentration of the sodium to potassium of up to 5.

24. The coating composition system according to claim 6, wherein the first aqueous composition further comprises sodium silicate in a ratio of molar concentration of the sodium to potassium of up to 3.

25. The coating composition system according to claim 7, wherein $R_1$ is a branched or straight, saturated or unsaturated $C_{4-12}$-alkyl group.

26. The coating composition system according to claim 9, wherein R11, R12, R13, R14, R15, and R16 independently are branched or straight, saturated or unsaturated $C_{1-3}$-alkyl group.

27. The coating composition system according to claim 10, wherein R21, R22, R23, R24, R25, R26, R27 and R28 independently are branched or straight, saturated or unsaturated $C_{1-3}$-alkyl group.

28. The coating composition system according to claim 11, wherein said second composition comprises said alkoxy silane compound and/or siloxane compound(s) in an amount of 0.1 to 60% by weight of the second composition.

29. The coating composition system according to claim 11, wherein said second composition comprises said alkoxy silane compound and/or siloxane compound(s) in an amount of 0.3 to 20% by weight of the second composition.

30. The coating composition system according to claim 11, wherein said second composition comprises said alkoxy silane compound and/or siloxane compound(s) in an amount of 0.3 to 18% by weight of the second composition.

31. The coating composition system according to claim 11, wherein said second composition comprises said alkoxy silane compound and/or siloxane compound(s) in an amount of 0.4 to 15% by weight of the second composition.

32. The coating composition system according to claim 11, wherein said second composition comprises said alkoxy silane compound and/or siloxane compound(s) in an amount of 1 to 13% by weight of the second composition.

33. The coating composition system according to claim 11, wherein said second composition comprises said alkoxy silane compound and/or siloxane compound(s) in an amount of 2 to 12% by weight of the second composition.

34. The coating composition system according to claim 11, wherein said second composition comprises said alkoxy silane compound and/or siloxane compound(s) in an amount of 2.5 to 12% by weight of the second composition.

35. The coating composition system according to claim 12, wherein said alkoxy silane compound and/or siloxane compound(s) are selected from triethoxyoctylsilane, dimethyl siloxane, and octamethylcyclotetrasiloxane, and any combination thereof.

36. The coating composition system according to claim 13, wherein the second aqueous composition further comprises a vinyl acrylate.

* * * * *